(12) United States Patent
Yokohata

(10) Patent No.: US 8,973,602 B2
(45) Date of Patent: Mar. 10, 2015

(54) GAS SHUTOFF DEVICE

(75) Inventor: Mitsuo Yokohata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 862 days.

(21) Appl. No.: 13/146,300

(22) PCT Filed: Jan. 25, 2010

(86) PCT No.: PCT/JP2010/000407
§ 371 (c)(1),
(2), (4) Date: Sep. 22, 2011

(87) PCT Pub. No.: WO2010/084780
PCT Pub. Date: Jul. 29, 2010

(65) Prior Publication Data
US 2012/0000551 A1 Jan. 5, 2012

(30) Foreign Application Priority Data
Jan. 26, 2009 (JP) ................................. 2009-014014

(51) Int. Cl.
*F16K 37/00* (2006.01)
*G01F 15/00* (2006.01)
(52) U.S. Cl.
CPC .................... *G01F 15/007* (2013.01)
USPC .......... 137/487.5; 137/557; 770/282; 702/45; 702/51
(58) Field of Classification Search
CPC . G01F 15/007; G05D 7/0623; G05D 16/2006
USPC ........... 137/382, 487.5, 551, 552.7, 557, 486; 700/282; 702/45, 47, 50, 51
See application file for complete search history.

(56) References Cited

U.S. PATENT DOCUMENTS 4,551,719 A * 11/1985 Carlin et al. ................. 340/3.7
4,852,403 A * 8/1989 Bednarz ........................ 73/201

(Continued)

FOREIGN PATENT DOCUMENTS

DE     10 2005 022 437 A1   11/2006
GB          2 313 201 A      11/1997

(Continued)

OTHER PUBLICATIONS

Extended European Search Report in corresponding European Application No. 10733387.4, dated Apr. 24, 2014, 11 pages.

(Continued)

*Primary Examiner* — William McCalister
(74) *Attorney, Agent, or Firm* — Brinks Gilson & Lione

(57) ABSTRACT

The present invention provides a gas shutoff device that prevents tampering procurement of gas or tamper due to stealing of the gas shutoff device.
When an event, in which a gas pressure value of a pressure measuring unit 32 after a predetermined operation performed by a provider in installation is kept equal to or less than a first predetermined pressure value for a first predetermined time or longer and then the gas pressure value is kept equal to or more than a second predetermined pressure value for a second predetermined time or longer, happens at a predetermined number of times, the gas is shut off by a shutoff unit 39, communication with the outside is performed by an external communication unit 34, restoration is permitted by a restoring unit 38 while when there is a predetermined operation by the provider after the shutoff, the restoration permission state implemented by communicating with the outside by the predetermined operation by the provider and inputting communication of a response from the outside.

9 Claims, 14 Drawing Sheets

(56) References Cited

U.S. PATENT DOCUMENTS

| | | | | |
|---|---|---|---|---|
| 4,907,450 | A | * | 3/1990 | Bednarz ................... 73/201 |
| 4,993,260 | A | * | 2/1991 | Bednarz ................... 73/201 |
| 5,910,774 | A | * | 6/1999 | Capriotti et al. ........... 340/637 |
| 6,109,477 | A | * | 8/2000 | Myers et al. ............... 222/1 |
| 6,296,148 | B1 | * | 10/2001 | Myers et al. ............... 222/71 |
| 6,421,616 | B1 | * | 7/2002 | Dickson .................... 702/45 |
| 6,463,389 | B1 | * | 10/2002 | Dickson .................... 702/35 |
| 6,745,104 | B1 | * | 6/2004 | Dickson .................... 700/236 |
| 6,819,292 | B2 | * | 11/2004 | Winter ..................... 343/702 |
| 6,954,178 | B2 | * | 10/2005 | Winter ................ 343/700 MS |
| 7,126,551 | B2 | * | 10/2006 | Winter ..................... 343/719 |
| 7,343,795 | B2 | * | 3/2008 | Winter ..................... 73/275 |
| 8,550,109 | B2 | * | 10/2013 | Miyata et al. ............... 137/357 |
| 2006/0076053 | A1 | * | 4/2006 | McGill ..................... 137/39 |
| 2010/0219933 | A1 | | 9/2010 | Ueki et al. |

FOREIGN PATENT DOCUMENTS

| | | |
|---|---|---|
| JP | 11-053636 A | 2/1999 |
| JP | 2001-033289 A | 2/2001 |
| JP | 2001-041796 A | 2/2001 |
| JP | 2001-296161 A | 10/2001 |
| JP | 3565552 B2 | 9/2004 |
| JP | 2005-148882 A | 6/2005 |
| JP | 2006-250806 A | 9/2006 |
| JP | 2008-122224 A | 5/2008 |
| WO | WO 2009/008108 A1 | 1/2009 |

OTHER PUBLICATIONS

International Search Report for International Application No. PCT/JP2010/000407, dated Mar. 16, 2010, 2 pages.

* cited by examiner

GAS SHUTOFF DEVICE

This application a 371 application of PCT/JP2010/000407 having an international filing date of Jan. 25, 2010, which claims priority to JP 2009-014014 filed Jan. 26, 2009, the entire contents of which are incorporated herein by reference.

TECHNICAL FIELD

The present invention relates to a gas shutoff device that prevents tampering procurement of gas or tamper due to stealing of the gas shutoff device.

BACKGROUND ART

In the related art, electricity, gas, and water are supplied from providers and the amount of supply is measured and managed by meters installed in the consumers' houses.

The meters are equipped with a sealing device that prevents the meters from being opened after installation and prevents unfair practice, and tamper is prevented by the sealing (see Patent Document 1). Hereinafter, the configuration is described with reference to FIG. 12 and FIG. 13.

FIG. 12 is a configuration view showing a method of combining a sealing device with a terminal cover, in which a sealing device 2 has a sealing screw fitting portion 21 where a sealing screw 6 that fixes a terminal cover 3 to the rear surface of the meter main body is inserted and a separation groove 22 that allows the sealing device 2 to be easily separated when removing the sealing screw fitting portion 21 from the sealing screw 6. Further, a non-contact tag 7 is bonded to the side 23 with the separation groove 22 by an adhesive. Further, the sealing screw 6 is put into the sealing screw fitting portion 21, such that the sealing screw 6 is fitted in the sealing screw fitting portion 21. Accordingly, the sealing device 2 seals the meter main body.

FIG. 13 is a configuration view showing the state when the sealing device 2 with the non-contact IC tag 7 bonded to the side 23 is removed from the terminal cover 3, in which when the sealing device 2 is detached from the terminal cover 3, the sealing device 2 is pulled in the direction of an arrow (upward) in the figure. Accordingly, cracks are generated from the separation groove 22 and the side 23 splits, in the sealing device 2, by the pulling. Therefore, the non-contact IC tag 7 bonded to the side 23 is broken.

As described above, when the sealing device 2 is mounted at one time on the terminal cover 3, it is impossible to turn the sealing screw 6 without breaking the sealing device 2, that is, the non-contact IC tag 7, such that it is impossible to open the contents of the meter main body. Therefore, since the sealing device 2 is broken when the meter main body is opened, when another sealing device 2 is replaced, the identification information transmitted from the non-contact IC tag bonded to the sealing device 2 and the identification information stored in the meter main body do not agree with each other, such that an abnormality can be recognized.

Further, in the gas shutoff device in the related art, when it is determined that the gas pressure value abnormally decreases, the gas is shut off and after shutoff, the gas is restored, with the safety ensured (for example, see Patent Document 2). This configuration is described with reference to FIG. 14.

FIG. 14 is a block diagram of a gas shutoff device of the related art, which includes a pressure measuring unit 32, a seismoscope 12, a shutoff determining unit 13, a shutoff unit 39, a flow rate measuring unit 35, a flow rate storing unit 16, an accumulating unit 17, a display unit 18, and an automatic restoration determining unit 19. The shutoff determining unit 13, the flow rate storing unit 16, the accumulating unit 17, and the automatic restoration determining unit 19 are implemented by, for example, a microcomputer. The pressure measuring unit 32 detects the pressure in a gas supply pipe and supplies a detection output signal to the shutoff determining unit 13 and the automatic restoration determining unit 19. The seismoscope 12 detects vibration or shock due to an earthquake or other causes and supplies a detection output signal to the shutoff determining unit 13 and the automatic restoration determining unit 19. The flow rate measuring unit 35 measures the flow rate of the gas flowing through a gas channel and supplies the measure flow rate to the accumulating unit 17. The accumulating unit 17 calculates an instantaneous flow rate on the basis of the detection output signal from the flow rate measuring unit 35 and calculates an accumulated flow rate by accumulating the calculated instantaneous flow rate. The calculated accumulated flow rate is stored in the flow rate storing unit 16 and also displayed by the display unit 18.

When the gas pressure value measured by the pressure measuring unit 32 abnormally decreases and the gas is shut off, first, the pressure measuring unit 32 measures the pressure of the gas, and then, the automatic restoration determining unit 19 determines whether the pressure measured by the pressure measuring unit 32 becomes equal to or more than pre-set pressure, and when pressure equal to or more than the set pressure is ensured, the automatic restoration determining unit 19 automatically restores the shutoff unit 39 to the open state. Further, when the set pressure is not ensured in the measurement of the pressure after the shutoff event is generated, it is required to go to the place where the gas shutoff device is manually installed and restore the shutoff unit 39 to the open state by restoration, such as operating a restoration switch.

[Patent Document 1] JP-A-2006-250806
[Patent Document 2] Japanese Patent No. 3565552

SUMMARY OF INVENTION

Technical Problem

However, there is a problem in that in the configuration of the related art, although it is possible to prevent an unfair practice on the main body of the system, it is not an effective measure against an unfair practice, such as bypassing the pipe.

Solution to Problem

Further, for example, when the pipe is bypassed, even if shutoff is performed by a drop in pressure, the normal use is made possible by a restoring operation after the shutoff, such that the pipe may be returned at the time of meter-reading such that tampering procurement of the gas is not discovered and the pipe is bypassed after the meter reading. There is a problem in that, by repetition of these acts, not only the tampering procurement of the gas, but gas leakage may occur.

In order to solve the problems, an object of the present invention is to provide a gas shutoff device that prevents an unfair practice by having a configuration that shuts off gas and prohibits a restoring operation later, when an event, in which a gas pressure value is kept equal to or less than a first predetermined pressure value for a first predetermined time or longer and then the gas pressure value is kept equal to or more than a second predetermined pressure value for a second predetermined time or longer, happens at a predetermined number of times.

In order to solve the problem, the present invention provides a gas shutoff device includes: a shutoff unit connected to a gas supply pipe to supply or shut off gas; a control unit for controlling the shutoff unit; a flow rate measuring unit for measuring a flow rate of the gas; a pressure measuring unit for measuring pressure of the gas; a restoring unit for turning a gas shutoff state by the shutoff unit into a restoration state for passing the gas; and an external communication unit for allowing communication with the outside, in which the control unit shuts off the gas by outputting to the shutoff unit, communicates with the outside by outputting to the external communication unit and prohibits a restoring operation by the restoring unit, or when there is a predetermined operation by the provider after the shutoff, the control unit implements the restoration permission state by communicating with the outside by the predetermined operation by the provider and inputting communication of response from the outside, when the following event happens in an output from the pressure measuring unit at a predetermined number of times after a predetermined operation performed by a provider in installation: a gas pressure value is kept equal to or less than a first predetermined pressure value for a first predetermined time or longer and then the gas pressure value is kept equal to or more than a second predetermined pressure value for a second predetermined time or longer.

Advantageous Effects of Invention

According to the gas shutoff device of the present invention, a provider can reliably grasp that shutoff is generated by bypassing of the pipe, and it is possible to prevent tampering procurement of the gas by bypassing of the pipe or tamper due to stealing of the gas shutoff device, which cannot be prevented only by sealing the system, and it is also possible to ensure safety.

DETAILED DESCRIPTION OF THE PREFERRED EMBODIMENTS

Figure 1:
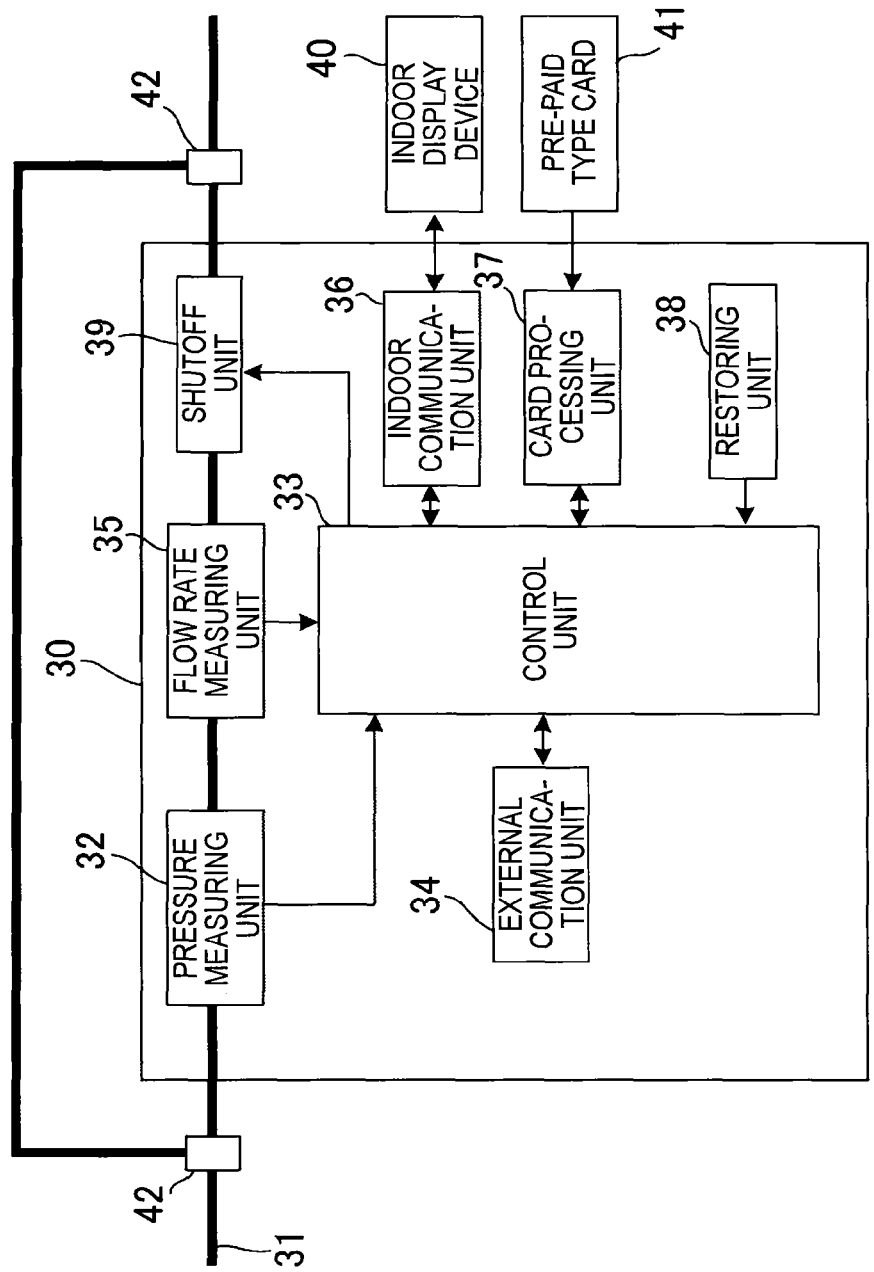
FIG. 1 is a block diagram of a gas shutoff device according to first to eighth embodiments of the present invention.

According to the first invention, a gas shutoff device includes: a shutoff unit connected to a gas supply pipe to supply or shut off gas; a control unit for controlling the shutoff unit; a flow rate measuring unit for measuring a flow rate of the gas; a pressure measuring unit for measuring pressure of the gas; a restoring unit for turning a gas shutoff state by the shutoff unit into a restoration state for passing the gas; and an external communication unit for allowing communication with the outside, in which the control unit shuts off the gas by outputting to the shutoff unit and prohibits a restoring operation by the restoring unit, when the following event happens in an output from the pressure measuring unit at a predetermined number of times after a predetermined operation performed by a provider in installation: a gas pressure value is kept equal to or less than a first predetermined pressure value for a first predetermined time or longer and then the gas pressure value is kept equal to or more than a second predetermined pressure value for a second predetermined time or longer.

Therefore, it is possible to prevent tampering procurement of the gas or tamper due to stealing of the gas shutoff device, and ensure safety, by prohibiting restoration, but allowing checking at least in meter-reading, when a gas pressure drop and pressure restoration, which are generated by removable and attachment of the gas shutoff device for bypassing the pipe, happen at a predetermined number of times, such that shutoff occurs, after a provider ascertains normality in checking in the installation, including the pipe.

According to the second invention, the control unit of the first invention communicates with the outside by outputting to the external communication unit, when a predetermined operation is performed by the provider in installation.

Therefore, it is possible to reliably manage the function to be effective, such that it is possible to prevent forgetting to set the function.

According to the third invention, particularly, the control unit of the first or second invention shuts off the gas by outputting to the shutoff unit and communicates with the outside by outputting to the external communication unit, when an event, in which a gas pressure value is kept equal to or less than a first predetermined pressure value for the first predetermined time or longer and then the gas pressure value is kept equal to or more than the second predetermined pressure value for a second predetermined time or longer, happens in an output from the pressure measuring unit at a predetermined number of times after a predetermined operation performed by a provider in installation.

Therefore, it is possible to prevent tampering procurement of the gas or tamper due to stealing of the gas shutoff device, and ensure safety, because when a gas pressure drop and pressure restoration, which are generated by removal and attachment of the gas shutoff device for bypassing the pipe, happen at a predetermined number of times, such that shutoff occurs, after a provider ascertain normality in checking in the installation, including the pipe, it is possible to grasp and rapidly cope with the fact.

According to the fourth invention, particularly, the control unit according to any one of the first to third inventions shuts off the gas by outputting to the shutoff unit and then implements a restoration permission state by a predetermined operation of the provider, when the following event happens in an output from the pressure measuring unit at a predetermined number of times: a gas pressure value is kept equal to or less than a first predetermined pressure value for the first predetermined time or longer and then the gas pressure value is kept equal to or more than the second predetermined pressure value for a second predetermined time or longer.

Therefore, since the provider needs to perform checking at the place for the restoration, it is possible to normalize unfair positions due to bypassing and ensure safety.

According to the fifth invention, particularly, the control unit according to any one of the first to third inventions shuts off the gas by outputting to the shutoff unit and then communicates with the outside by outputting to the external communication unit by a predetermined operation of the provider, and implements a restoration permission state by inputting communication of a response from the outside, when an event, in which a gas pressure value is kept equal to or less than a first predetermined pressure value for the first predetermined time or longer and then the gas pressure value is kept equal to or more than the second predetermined pressure value for a second predetermined time or longer, happens at a predetermined number of times, by an output from the pressure measuring unit.

Therefore, the provider can finish checking at the place and reliably manage normalizing of the unfair positions due to bypassing, and it is possible to leave a record and ascertain the soundness of the communication with the outside.

According to the sixth invention, a card processing unit that reads a pre-paid type card is included, and particularly, the control unit according to any one of the first to third inventions shuts off the gas by outputting to the shutoff unit and prohibits a restoring operation by the restoring unit, when the following event happens in an output from the pressure measuring unit at a predetermined number of times after an output from the card processing unit triggered by insertion of a provider operation card by the provider in installation, a gas pressure value is kept equal to or less than a first predetermined pressure value for the first predetermined time or longer and then the gas pressure value is kept equal to or more than the second predetermined pressure value for a second predetermined time or longer.

Therefore, a provider can simply and reliably make the function effective by ascertaining normality in checking in the installation, including the pipe, and inserting the provider operation card. Further, it is possible to grasp shutoff due to bypassing of the pipe and prevent tampering procurement of the gas or an unfair practice by stealing of the gas shutoff device.

According to the seventh invention, particularly, the control unit of the sixth invention shuts off the gas by outputting to the shutoff unit and then a restoration permission state is implemented by an output from the card processing unit when the provider inserts a provider operation card, when the following event happens in an output from the pressure measuring unit at a predetermined number of times: a gas pressure value is kept equal to or less than a first predetermined pressure value for the first predetermined time or longer and then the gas pressure value is kept equal to or more than the second predetermined pressure value for a second predetermined time or longer.

Therefore, the provider needs to perform checking at the place for the restoration. Further, it is possible to simply and reliably implement the restoration permission state by inserting the provider operation card and it is possible to normalize the unfair positions due to bypassing and ensure safety.

According to the eighth invention, particularly, the control unit of the sixth invention shuts off the gas by outputting to the shutoff unit, communicates with the outside by outputting to the external communication unit by an output from the card processing unit when the provider inserts a provider operation card, and implements a restoration permission state by inputting communication of a response from the outside, when the following event happens in an output from the pressure measuring unit at a predetermined number of times: a gas pressure value is kept equal to or less than a first predetermined pressure value for the first predetermined time or longer and then the gas pressure value is kept equal to or more than the second predetermined pressure value for a second predetermined time or longer.

Therefore, the provider can finish checking at the place and simply and reliably manage normalizing of the unfair positions due to bypassing by inserting the provider operation card, and it is possible to leave a leave a record and ascertain soundness of the communication with the outside.

According to the ninth invention, there is a program that causes a computer to function, as all or a part of the gas shutoff device according to any one of the first to eighth inventions. Further, is the program makes it possible to easily implement at least a part of the program of the invention, using a common computer or a server. Further, it is possible to simply distribute or install the program by transmitting the program, using a communication line recorded on a recording medium.

Since the present invention can accomplish the object of the present invention by implementing the first to eighth embodiments of the present invention, the embodiments corresponding to the claims are described hereafter in detail with the drawings, which are preferred embodiments for implementing the present invention. Further, the present invention is not limited to the embodiments. Further, the components having the same configuration and operational effects are given the same reference numerals in the description of the embodiments in order to avoid repetitive description.

(First Embodiment)

FIG. 1 is a block diagram of a gas shutoff device according to the first embodiment of the present invention.

In FIG. 1, a gas shutoff device 30 is disposed at the middle of a gas supply pipe 31 and one or more gas apparatuses installed in each customer's house is connected to the downstream pipe.

The gas shutoff device 30 includes a flow rate measuring unit 35, a shutoff unit 39, a control unit 33, a pressure measuring unit 32, an external communication unit 34, an indoor communication unit 36, a card processing unit 37, and a restoring unit 38.

The flow rate measuring unit 35 is connected to the middle of the path of the gas supply pipe 31 and measures the gas flow rate in the gas supply pipe 31.

The shutoff unit 39 is connected to the middle of the path of the gas supply pipe 31 and stops supply of gas by blocking the gas supply pipe 31 on the basis of an instruction from the control unit 33.

The pressure measuring unit 32 is connected to the middle of the path of the gas supply pipe 31 and measures the gas pressure inside the gas supply pipe 31.

The control unit 33 performs a safety process, such as various warnings and shutoff, in addition to controlling the operations of the parts in the gas shutoff apparatus 30. The control unit 33 composed of a microcomputer and the peripheral circuit performs corresponding processes by executing predetermined operational programs, thereby implementing the functions.

The external communication unit 34 has a wire or wireless communication function and is connected with a control center (not shown), for example, through a public line. The external communication unit 34 communicates a variety of information and commands or signals with the control center.

The control center includes a computer and implements the functions of a management section, such that the control center includes a processor constituting the computer and operational programs and executes a predetermined operational program for the processor, thus implementing the functions.

The indoor communication unit 36 communicates a variety of information with an indoor display device 40 and inputs the information on the operation of the indoor display device 40 by communicating a variety of information with the indoor display device 40.

The card processing unit 37 reads and writes fee information on a pre-paid type card 41 on the basis of instructions from the control unit 33.

The restoring unit 38 is for restoring the gas that is shut off by the shutoff unit 39 and is generally implemented by a switch, and a signal is input to the control unit 33 when the switch is pressed and the control unit 33 restores gas supply by outputting to the shutdown unit 39.

The operation about a process in installation of the gas shutoff device having the configuration described above is described hereafter.

Figure 2:
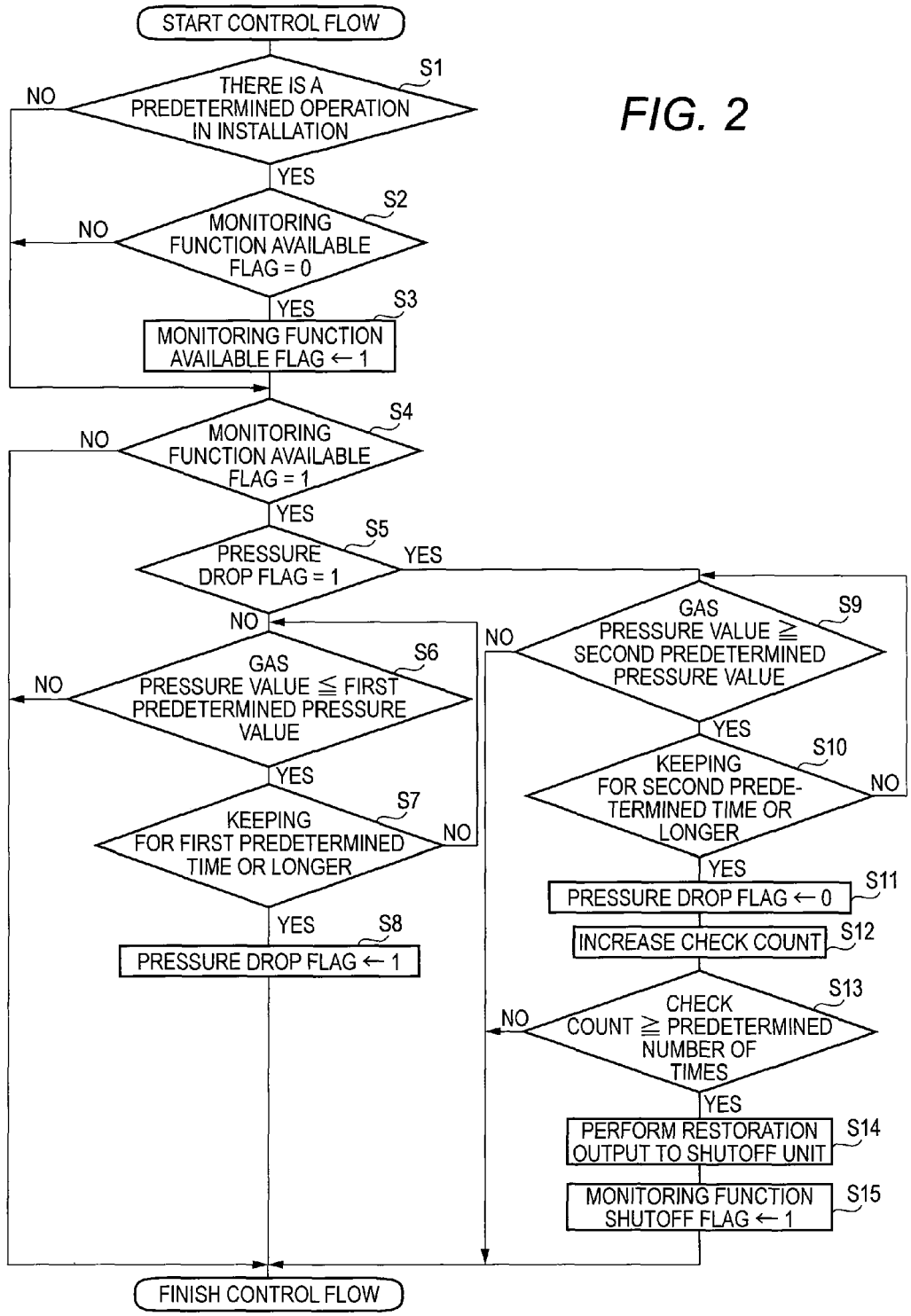
FIG. 2 is a flowchart showing a process in the installation of the gas shutoff device according to the first embodiment of the present invention.

FIG. 2 is a flowchart showing a process in installation of the gas shutoff device according to the first embodiment of the present invention.

In FIG. 2, the control unit 33, in step 1 (hereafter, indicated by S), determines whether a provider performs a predetermined operation in installation, and when the predetermined operation is not performed, the control unit proceeds to S4, or when the predetermined operation is performed, the control unit determines whether a monitoring function available flag for monitoring tampering procurement of the gas by using the pressure value is 0 (S2), such that when the flag is not 0, the control unit proceeds to S4, or when the flag is 0, the control unit makes the monitoring function available flag into 1 in S3. In S4, it is determined that the monitoring function available flag is 1, and when it is not 1, the control unit skips the process, or when it is 1, the control unit determines whether a pressure drop flag, which represents that the gas pressure value is kept equal to or less than a first predetermined pressure value for a first determined time or longer before, is 1 in S5 and then when it is 1, the control unit proceeds to S9, or when it is not 1, the control unit proceeds to S6. In S6, it is determined that the gas pressure value is equal to or less than the first predetermined value, and when the gas pressure value is equal to or less than the first pressure value, the control unit skips the process, or when the gas pressure value is not equal to or less than the first predetermined pressure value, the control unit determines whether it keeps for a first predetermined time or longer (S7). When it does not keep for the first predetermined time or longer, the control unit proceeds to S6, or when it keeps for the first predetermined time or longer, the control unit makes the pressure drop flag into 1 in S8. In S9, it is determined that the gas pressure value is equal to or more than a second predetermined pressure value, and when the gas pressure value is equal to or more than the second predetermined pressure value, the control unit skips the process, or when the gas pressure value is equal to or less than the second predetermined pressure value, the control unit determines that it keeps for a second predetermined time or longer (S10). When it does not keep for the second predetermined time or longer, the control unit proceeds to S9, and when it keeps for the second predetermined time or longer, the control unit makes the pressure drop flag into 0 in S11 and increases the check count in S12. In S13, it is determined that the check count is equal to or more than a predetermined number of times, and when the check count is equal to or more than the predetermined number of times, the control unit shuts off the gas supply pipe 31 by performing shutoff output to the shutoff unit 39 in S14 and makes a monitoring function shutoff flag, which represents that the shutoff is performed by monitoring tampering procurement of the gas, into 1 (S15).

A predetermined operation performed by the provider in S1 is described below. The predetermined operation is an operation that only the provider can perform, for example, pressing several times the restoring unit 38 where a predetermined interval is set or performing a predetermined operation on the switch of the indoor display device 40, and it may be possible to perform a predetermined operation by connecting a handy terminal to the external communication unit 34. Further, the handy terminal may be a wireless type and it may be implemented by wireless communication (not shown) with the gas shutoff device 30.

Further, when the supply of gas is stopped by construction or the like, it is the same event as tampering procurement of the gas, such that a function that clears the check count by a predetermined operation the same as or different from the installation time in meter-reading or the like after installation, in addition to a predetermined operation in installation by the provider or the like, in order to initialize the monitoring function after the construction is finished and the gas is re-supplied.

Next, the first predetermined pressure value that is compared with the gas pressure value in S6 and the second predetermined pressure value that is compared with the gas pressure value in S9 are described.

Figure 15:
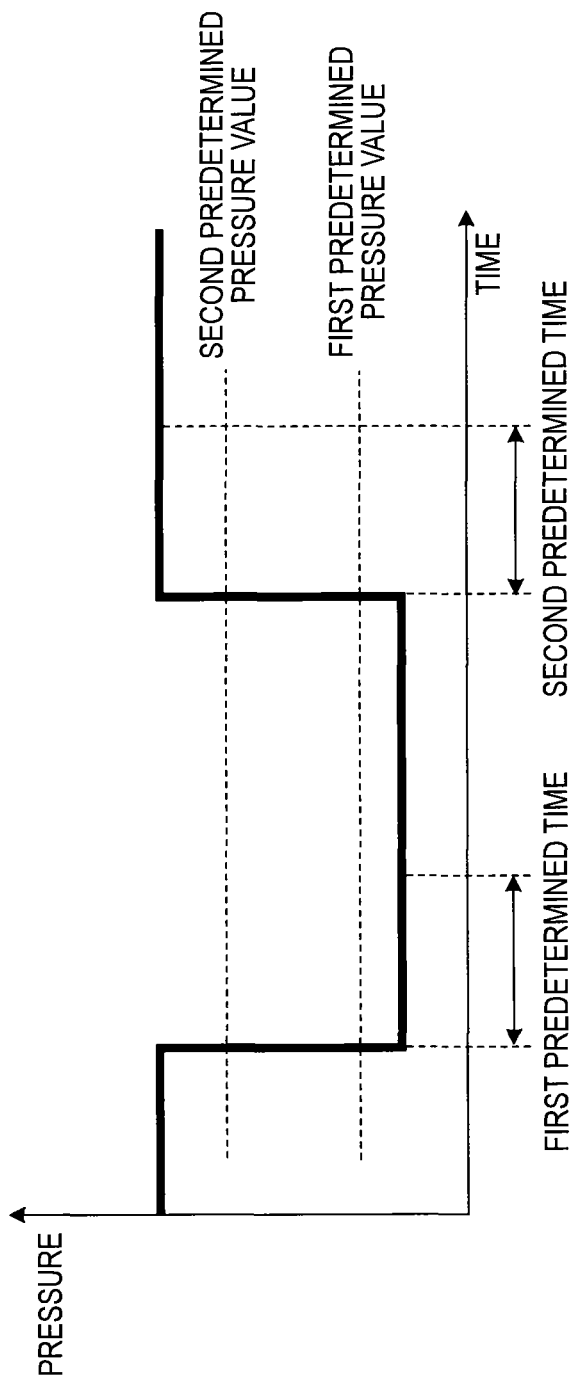
FIG. 15 is a diagram showing a change in gas pressure in the bypassing of a gas pipe according to the first embodiment of the present invention.

FIG. 15 is a diagram showing a change of gas pressure in bypassing of a gas pipe. As shown in FIG. 1, a bypass pipe 42 is attached to the gas supply pipe 31, ahead of and behind the gas shutoff device 30 and the gas that is used is bypassed, such that the flow rate of the gas flowing to the flow rate measuring unit 35 is smaller than the actually used amount, and thus, the gas can be procured by tamper. However, the pipe is examined when the gas shutoff device 30 is installed, such that the bypassing is performed after the installation. At this time, the gas shutoff device 30 is separated from the gas supply pipe 31, such that the gas pressure value measured by the pressure measuring unit 32 of the gas shutoff device 30 becomes substantially the same as the atmospheric pressure. The first pressure value that is compared with the gas pressure in S6 is a value obtained by adding predetermined pressure to the average atmospheric pressure and can be made sufficiently lower than a common pressure change, such that it is possible to the gas shutoff device 30 is separated from the gas supply pipe 31. Further, when the bypassing of the pipe is finished, the gas shutoff device 30 is installed again, and the gas flows, the pressure of the gas increases, the pressure measuring unit 32 measure accurate gas pressure even though the pipe is bypassed. It is possible to determine that the gas shutoff device 30 that has been separated is installed again, by making the second predetermined pressure value, which is compared with the gas pressure value in S9, a lower limit of the gas pressure. Further, the first predetermined time in which the gas pressure that is compared in S7 is kept equal to or less than the first predetermined pressure value is set to prevent erroneous determination due to temporal gas pressure change and may be set shorter than the time for separation of the gas shutoff device 30, bypassing, and re-installation. The second predetermined time in S10 is also set to prevent erroneous determination and set to grasp that the gas pressure is reliably restored. Further, since the bypassing is required to be returned to the initial state for meter-reading, the gas shutoff device 30 and the bypass pipe 42 are separated again and the gas shutoff device is installed again, such that at least two works are necessary till the next meter-reading from the meter-reading; therefore, the change of the gas shown in FIG. 15 is generated two times. The predetermined number of times that is compared in S13 may be at least two times, or the predetermined number of times may be increased in order to prevent erroneous determination.

Further, it is possible to reliably determine even tampering procurement that directly connect a pipe without bypassing the pipe, with the gas shutoff device 30 separated, and installs again the gas shutoff device before meter-reading.

Figure 3:
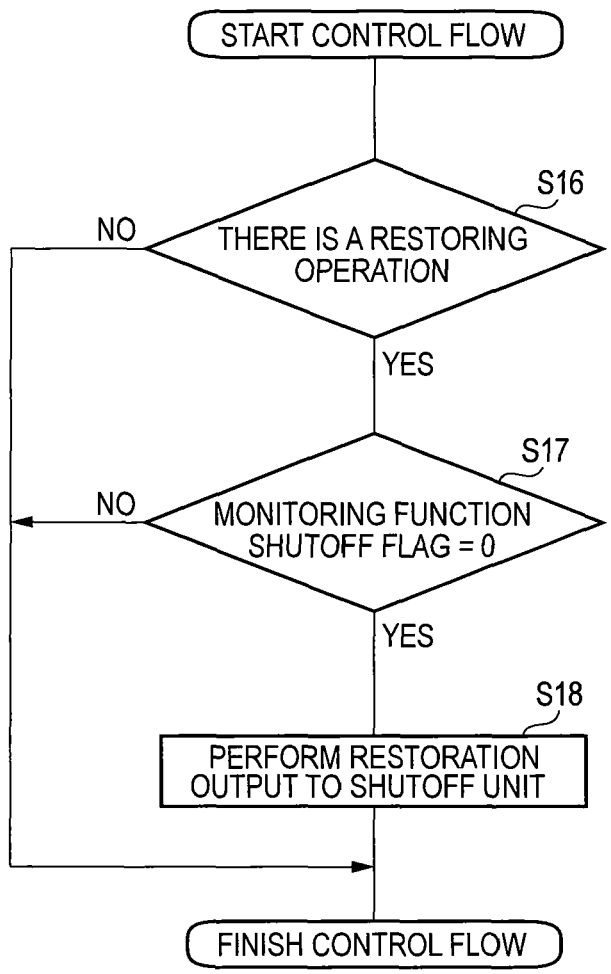
FIG. 3 is a flowchart showing a process in the restoring operation of the gas shutoff device according to the first embodiment of the present invention.

FIG. 3 is a flowchart showing a process of a restoring operation of the gas shutoff device according to the first embodiment of the present invention.

In FIG. 3, the control unit 33 determines whether there is a restoring operation by input from the restoring unit 38 (S16), and when it is determined that there is a restoring operation in S17, the control unit determines whether the monitoring function shutoff flag that represents shutoff due to tampering procurement of the gas is 0, and when the monitoring function shutoff flag is 1, that is, when the shutoff is performed with the gas pressure value equal to or less than the predetermined gas pressure value, the control unit skips the process, or when the monitoring function shutoff flag is 0, the control unit restores from the shutoff state by performing restoration output to the shutoff unit 39 in S18.

As described above, in the embodiment, since it is possible to grasp shutoff at least in meter-reading by prohibiting a restoring operation when the shutoff is generated by bypassing of the pipe after the provider ascertains normality, including the pipe, in checking in installation, it is possible to prevent tampering procurement of the gas or tamper due to stealing of the gas shutoff device, thus ensuring safety.

(Second Embodiment)

Figure 4:
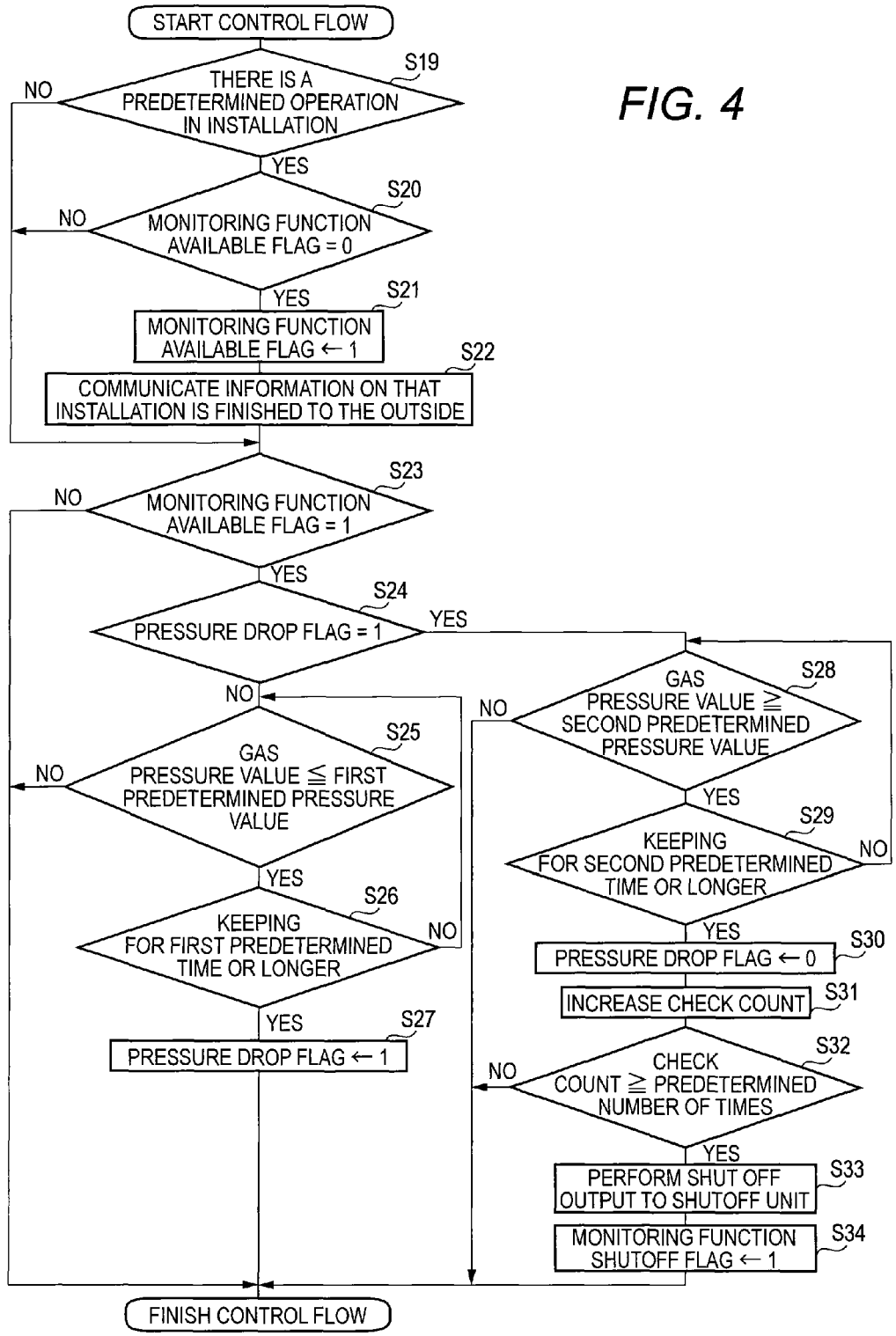
FIG. 4 is a flowchart showing a process after the installation of the gas shutoff device according to the second embodiment of the present invention.

FIG. 4 is a flowchart showing a process after installation of the gas shutoff device according to the second embodiment of the present invention. Only the control device 33 and the program shown in FIG. 1, according to the first embodiment, are different and the block diagram of the gas shutoff device is the same as FIG. 1. That is, the control unit 33 stores a program that executes the control flow from S19 to S34 shown in FIG. 4.

In FIG. 4, the control unit 33 determines whether a provider performs a predetermined operation in installation (S19), and when the predetermined operation is not performed, the control unit proceeds to S23, or when the predetermined operation is performed, the control unit determines whether a monitoring function available flag for monitoring tampering procurement of the gas by using the pressure value is 0 (S20), such that when the flag is not 0, the control unit proceeds to S23, or when the flag is 0, the control unit makes the monitoring function available flag into 0 in S21 and communicates the information on that installation is finished by outputting to the external communication unit 34 (S22). In S23, it is determined that the monitoring function available flag is 1, and when it is not 1, the control unit skips the process, or when it is 1, the control unit determines whether a pressure drop flag, which represents that the gas pressure value is kept equal to or less than a first predetermined pressure value for a first determined time or longer before, is 1 in S24, and then when it is 1, the control unit proceeds to S28, or when it is not 1, the control unit proceeds to S25. In S25, it is determined that the gas pressure value is equal to or less than the first predetermined value, and when the gas pressure value is equal to or less than the first pressure value, the control unit skips the process, or when the gas pressure value is not equal to or less than the first predetermined pressure value, the control unit determines whether it keeps for a first predetermined time or longer (S26). When it does not keep for the first predetermined time or longer, the control unit proceeds to S25, or when it keeps for the first predetermined time or longer, the control unit makes the pressure drop flag into 1 in S27. In S28, it is determined that the gas pressure value is equal to or more than a second predetermined pressure value, and when the gas pressure value is equal to or more than the second predetermined pressure value, the control unit skips the process, or when the gas pressure value is equal to or less than the second predetermined pressure value, the control unit determines that it keeps for a second predetermined time or longer (S29). When it does not keep for the second predetermined time or longer, the control unit proceeds to S28, and when it keeps for the second predetermined time or longer, the control unit makes the pressure drop flag into 0 in S30 and increases the check count in S31. In S32, it is determined that the check count is equal to or more than a predetermined number of times, and when the check count is equal to or more than the predetermined number of times, the control unit shuts off the gas supply pipe 31 by performing shutoff output to the shutoff unit 39 in S33 and makes a monitoring function shutoff flag, which represents that the shutoff is performed by monitoring tampering procurement of the gas, into 1 (S34).

Further, when the supply of gas is stopped by construction or the like, it is the same event as tampering procurement of the gas, such that a function that clears the check count by input from the external communication unit 34, in order to initialize the monitoring function after the construction is finished and the gas is re-supplied.

As described above, since it is possible to reliably manage that the function is effective, it is possible to prevent forgetting to set the function.

(Third Embodiment)

Figure 5:
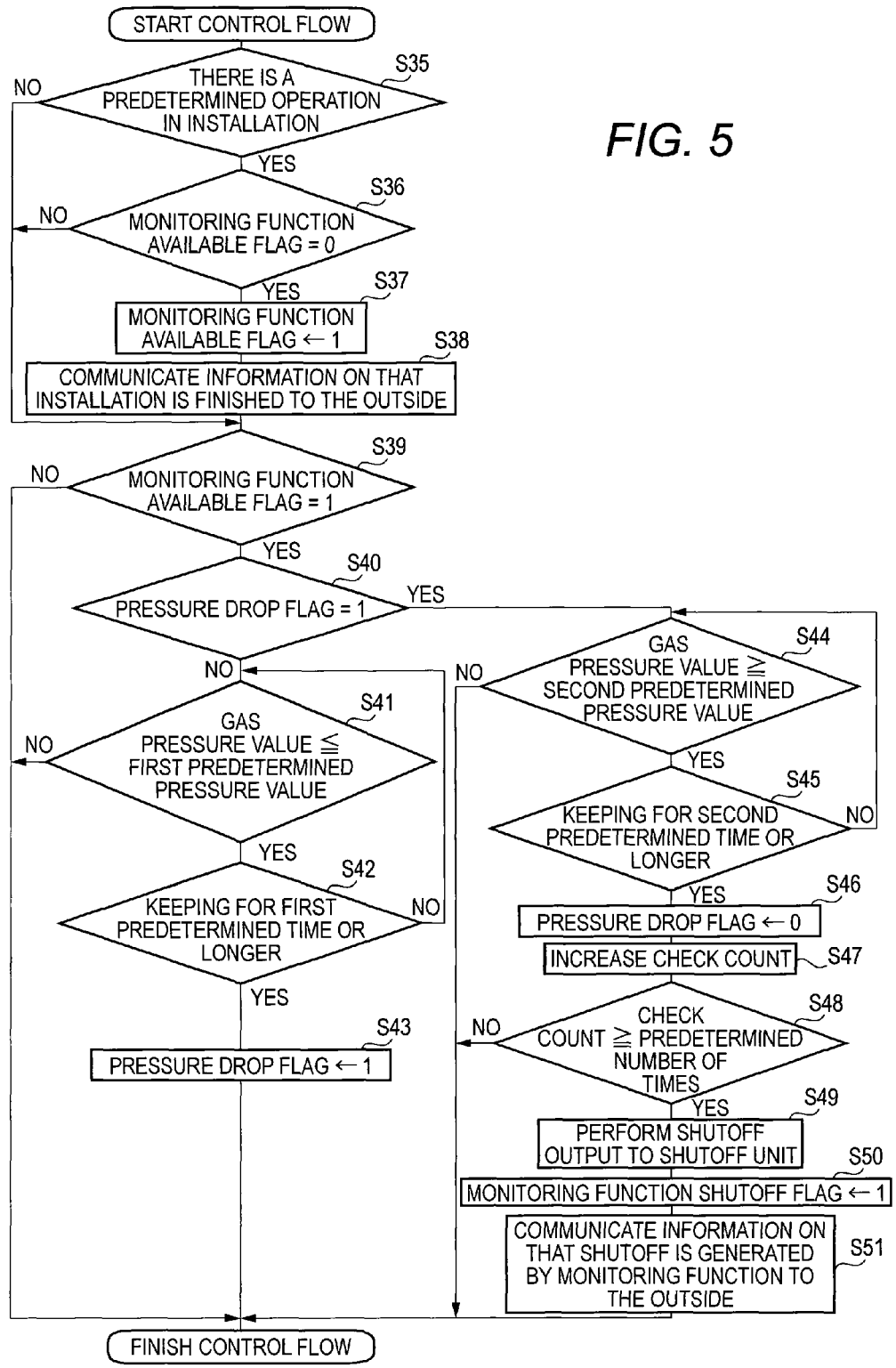
FIG. 5 is a flowchart showing a process after the installation of the gas shutoff device according to the third embodiment of the present invention.

FIG. 5 is a flowchart showing a process after installation of the gas shutoff device according to the third embodiment of the present invention. Only the control device 33 and the program shown in FIG. 1, according to the first embodiment, are different and the block diagram of the gas shutoff device is the same as FIG. 1. That is, the control unit 33 stores a program that executes the control flow from S35 to S51 shown in FIG. 5.

In FIG. 5, the control unit 33 determines whether a provider performs a predetermined operation in installation (S35), and when the predetermined operation is not performed, the control unit skips the process, or when the predetermined operation is performed, the control unit determines whether a monitoring function available flag for monitoring tampering procurement of the gas by using the pressure value is 0 (S36), such that when the flag is not 0, the control unit proceeds to S39, or when the flag is 0, the control unit makes the monitoring function available flag into 0 in S37 and communicates the information on that installation is finished by outputting to the external communication unit 34 (S38). In S39, it is determined that the monitoring function available flag is 1, and when it is not 1, the control unit skips the process, or when it is 1, the control unit determines whether a pressure drop flag, which represents that the gas pressure value is kept equal to or less than a first predetermined pressure value for a first determined time or longer before, is 1 in S40, and then when it is 1, the control unit proceeds to S44, or when it is not 1, the control unit proceeds to S41. In S41, it is determined that the gas pressure value is equal to or less than the first predetermined value, and when the gas pressure value is equal to or less than the first pressure value, the control unit skips the process, or when the gas pressure value is not equal to or less than the first predetermined pressure value, the control unit determines whether it keeps for a first predetermined time or longer (S42). When it does not keep for the first predetermined time or longer, the control unit proceeds to S41, or when it keeps for the first predetermined time or longer, the control unit makes the pressure drop flag into 1 in S43. In S44, it is determined that the gas pressure value is equal to or more than a second predetermined pressure value, and when the gas pressure value is equal to or more than the second predetermined pressure value, the control unit skips the process, or when the gas pressure value is equal to or less than the second predetermined pressure value, the control unit determines that it keeps for a second predetermined time or longer (S45). When it does not keep for the second predetermined time or longer, the control unit proceeds to S44, and when it keeps for the second predetermined time or longer, the control unit makes the pressure drop flag into 0 in S46 and increases the check count in S47. In S48, it is determined that the check count is equal to or more than a predetermined number of times, and when the check count is equal to or more than the predetermined number of times, the control unit shuts off the gas supply pipe 31 by performing shutoff output to the shutoff unit 39 in S49 and makes a monitoring function shutoff flag, which represents that the shutoff is performed by monitoring tampering procurement of the gas, into 1 (S50). In S51, the control unit communicates the information on that shutoff is generated by the monitoring function by outputting to the external communication unit 34.

As described above, in the embodiment, since it is possible to grasp at one shutoff due to bypassing of the pipe after the provider ascertains normality, including the pipe, in checking in installation, it is possible to rapidly cope with the fact and prevent tampering procurement of the gas or tamper due to stealing of the gas shutoff device, thus ensuring safety.

(Fourth Embodiment)

Figure 6:
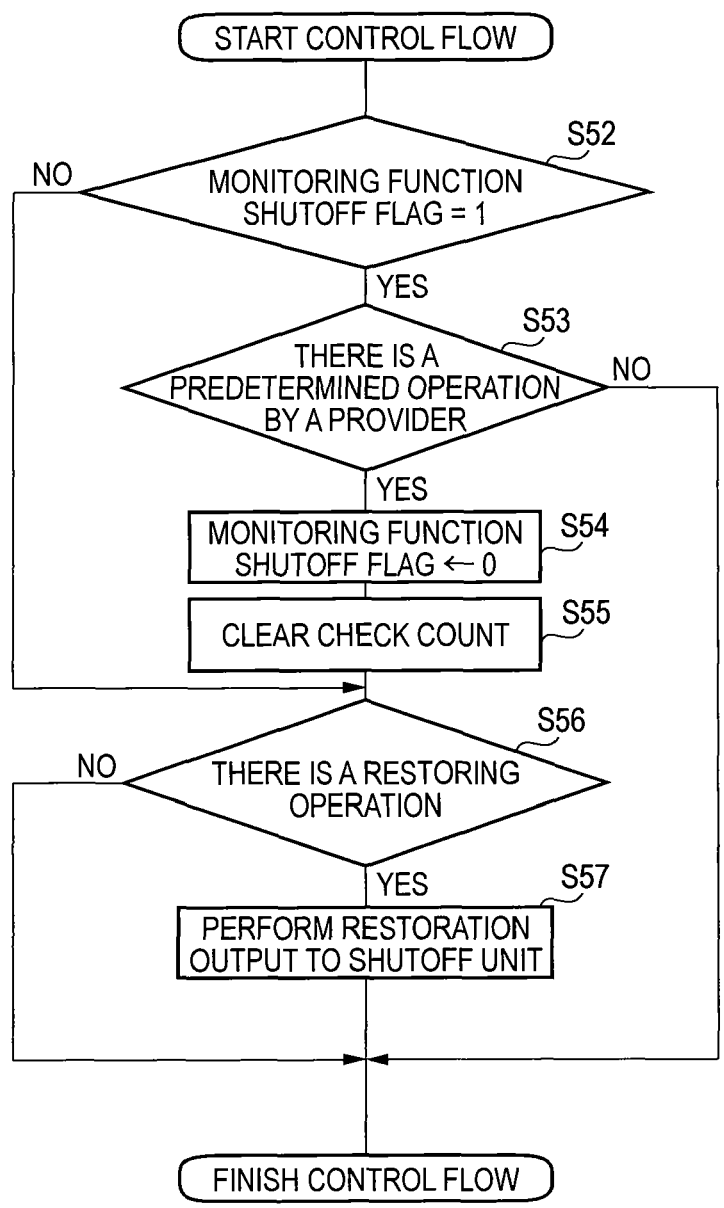
FIG. 6 is a flowchart showing a process after the restoring operation from a shutoff state of the gas shutoff device according to the fourth embodiment of the present invention.

FIG. 6 is a flowchart showing a process of a restoring operation from a shutoff state of the gas shutoff device according to the fourth embodiment of the present invention. Only the control device 33 and the program shown in FIG. 1, according to the first embodiment, are different and the block diagram of the gas shutoff device is the same as FIG. 1. That is, the control unit 33 stores a program that executes the control flow from S52 to S57 shown in FIG. 6.

In FIG. 6, the control unit 33 determines whether a monitoring function shutoff flag 1 that represents shutoff by monitoring of tampering procurement of the gas is 1 (S52), such that when the monitoring function shutoff flag is 0, the control unit proceeds to S56, or when the monitoring function shutoff flag is 1, the control unit determines whether there is a predetermined operation by the provider in S53, such that when there is a predetermined operation, the control unit makes the monitoring function shutoff flag into 0 (S54) and clears the check count in S55. The control unit determines whether there is a restoring operation by input from the restoring unit 38 in S56, such that when there is a restoring operation, the control unit restores supply of gas by performing restoration output to the shutoff unit 39 (S57).

As described above, in the embodiment, since the provider needs to perform checking at the place for the restoration, it is possible to normalize unfair positions due to bypassing and ensure safety.

(Fifth Embodiment)

Figure 7:
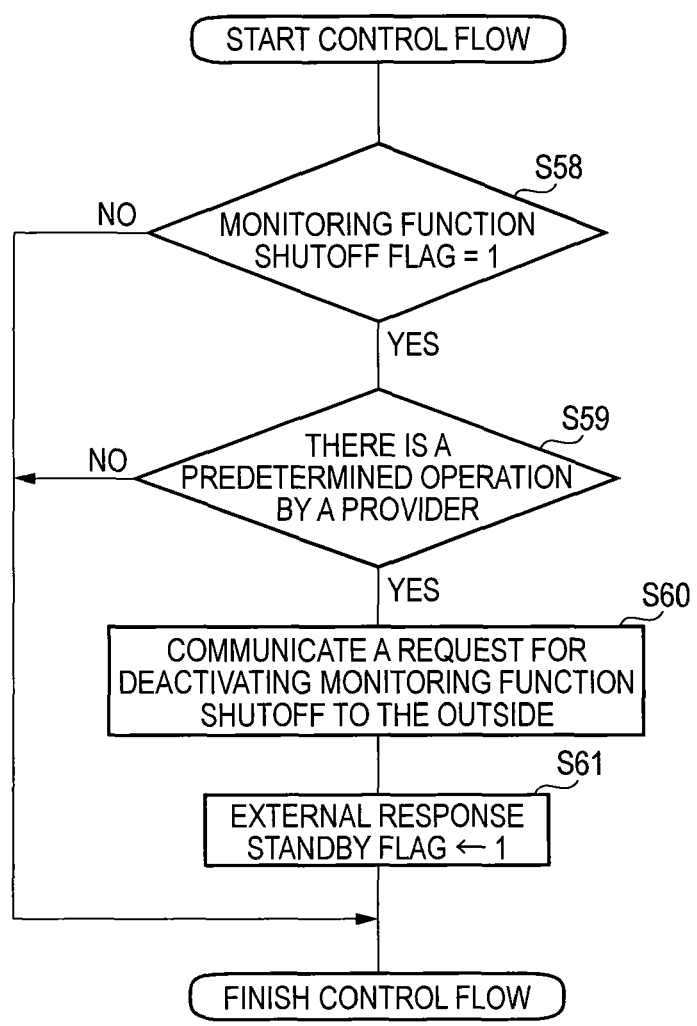
FIG. 7 is a flowchart showing a process of a request for deactivating monitoring function shutoff of the gas shutoff device according to the fifth embodiment of the present invention.

FIG. 7 is a flowchart showing a process of a request for deactivating monitoring function shutoff of the gas shutoff device according to the fourth embodiment of the present invention. Only the control device 33 and the program shown in FIG. 1, according to the first embodiment, are different and the block diagram of the gas shutoff device is the same as FIG. 1. That is, the control unit 33 stores a program that executes the control flow from S58 to S61 shown in FIG. 7.

In FIG. 7, the control unit 33 determines whether a monitoring function shutoff flag 1 that represents shutoff by monitoring of tampering procurement of the gas is 1 (S58), such that when the monitoring function shutoff flag is 1, the control unit determines whether there is a predetermined operation by the provider in S59, and when there is a predetermined operation, the control unit communicates a request for deactivating the monitoring function shutoff by outputting to the external communication unit 34 in S60 and makes an external response standby flag into 1 (S61).

Figure 8:
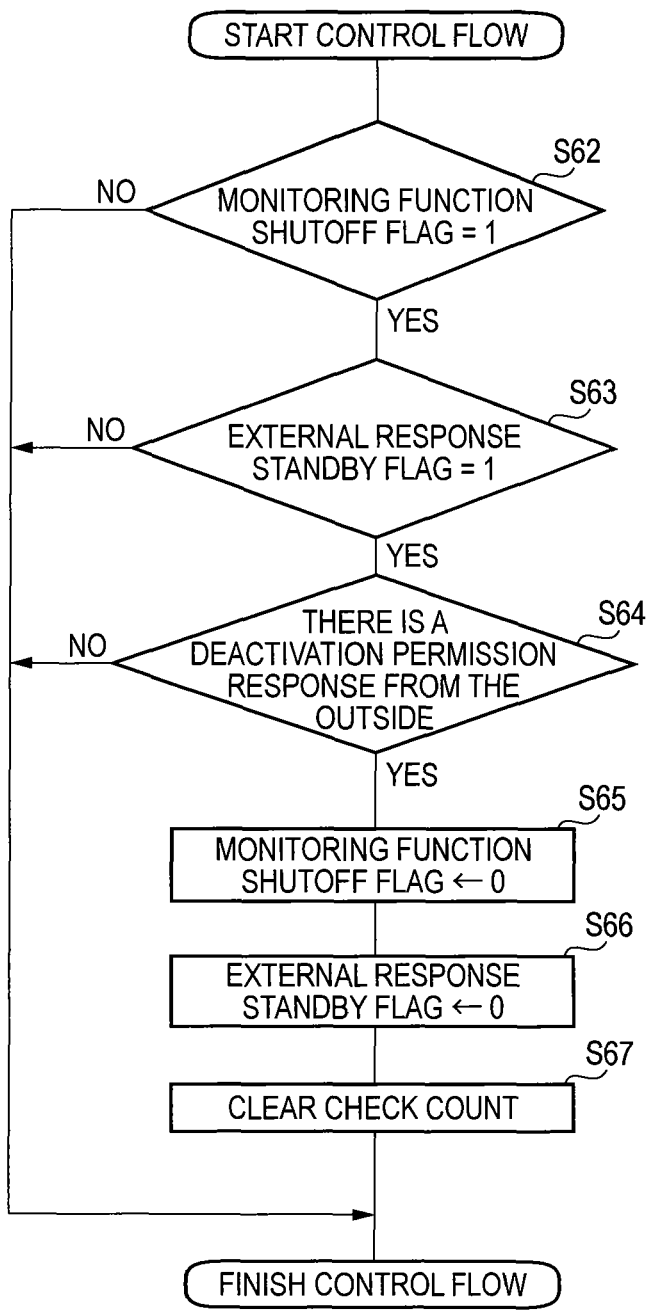
FIG. 8 is a flowchart showing a process of monitoring function shutoff deactivation permission of the gas shutoff device according to the fifth embodiment of the present invention.

FIG. 8 is a flowchart showing a process of monitoring function shutoff deactivation permission of the gas shutoff device according to the fifth embodiment of the present invention. Only the control device 33 and the program shown in FIG. 1, according to the first embodiment, are different and the block diagram of the gas shutoff device is the same as FIG. 1. That is, the control unit 33 stores a program that executes the control flow from S62 to S67 shown in FIG. 8.

In FIG. 8, the control unit 33 determines whether a monitoring function shutoff flag 1 that represents shutoff by monitoring of tampering procurement of the gas is 1 (S62), such that when the monitoring function shutoff flag is 1, the control unit determines whether the external response standby flag is 1 in S63, such that when the external response standby flag is 1, the control unit determines whether there is a deactivation permission response by input from the external communication unit 34 in S64. When there is a deactivation permission response in S64, the control unit makes the monitoring function shutoff flag into 0 in S65 and makes the deactivation permission response flag into 0 (566), clears the check count in S67; thereafter, restoration from the shutoff state becomes possible by an restoring operation. The description of the restoring operation is not provided, because it is the same as in the flowchart shown in FIG. 3.

As described above, in the embodiment, the provider can finish checking at the place and reliably manage normalizing of the unfair positions due to bypassing, and it is possible to leave a record and ascertain soundness of the communication with the outside.

(Sixth Embodiment)

Figure 9:
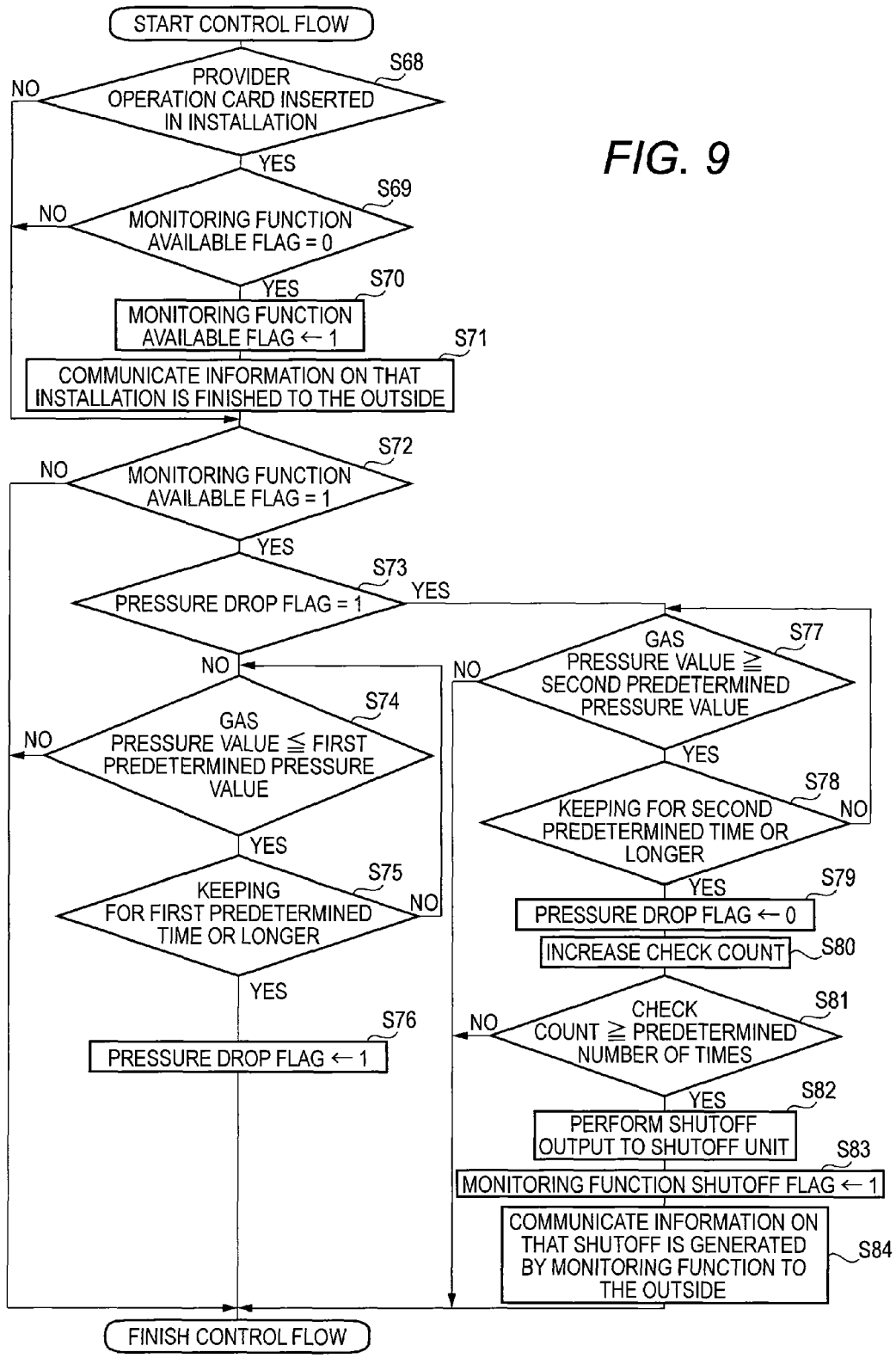
FIG. 9 is a flowchart showing a process after the installation of the gas shutoff device according to the sixth embodiment of the present invention.

FIG. 9 is a flowchart showing a process after installation of the gas shutoff device according to the sixth embodiment of the present invention. Only the control device 33 and the program shown in FIG. 1, according to the first embodiment, are different and the block diagram of the gas shutoff device is the same as FIG. 1. That is, the control unit 33 stores a program that executes the control flow from S68 to S84 shown in FIG. 9.

In FIG. 9, the control unit 33 determines whether the provider inserts a provider operation card in installation by input of the card processing unit 37 (S68), such that when the provider operation card is not inserted, the control unit skips the process, or when the provider operation card is inserted, the control unit determines whether a monitoring function available flag that monitors tampering procurement of the gas by using the gas pressure value is 0 (S69), such that when it is not 0, the control unit proceeds to S72, or when it is 0, the control unit makes the monitoring function available flag into 0 in S70 and communicates information on that the installation is finished by outputting to the external communication unit 34 (S71). In S72, it is determined whether the monitoring function available flag is 1, such that when it is not 1, the control unit skips the process, or when it is 1, the control unit determines whether a pressure drop flag, which represents that the gas pressure value is kept equal to or less than a first predetermined pressure value for a first determined time or longer before, in S73, such that when it is 1, the control unit proceeds to S77, or when it is not 1, the control unit proceeds to S74. In S74, it is determined whether the gas pressure value is equal to or less than the first predetermined pressure value, such that when the gas pressure value is equal to or less than the first predetermined value, the control unit skips the process, or when the gas pressure value is equal to or less than the first predetermine pressure value, the control unit determines whether the gas pressure value keeps for the first predetermined time or longer (S75), such that when it keeps for the first predetermined time or longer, the control unit proceeds to S74, or when it keeps for the first predetermined time or longer, the control unit makes the pressure drop flag into 1 in S76. In S77, it is determined whether the gas pressure value is equal to or more than the second predetermined pressure value, such that when the gas pressure value is equal to or more than the second predetermined pressure value, the control unit skips the process, or when the gas pressure value is equal to or less than the second predetermined pressure value, the control unit determines whether the gas pressure value keeps for the second predetermined time or longer (S78), such that when it does not keep for the second predetermined time or longer, the control unit proceeds to S77, or when it keeps for the second predetermined time or longer, the control unit makes the pressure drop flag into 0 in S79 and increases the check count in S80. In S81, it is determined whether the check count is equal to or more than a predetermined number of times, such that when it is equal to or more than the predetermined number of times, the control unit shuts off the gas supply pipe 31 by performing shutoff output to the shutoff unit 39 in S82 and makes a monitoring function shutoff flag, which represents that the shutoff is performed by monitoring tampering procurement of the gas, into 1 (S83). In S84, the control unit communicates the information on that shutoff is generated by the monitoring function by outputting to the external communication unit 34.

The provider operation card in installation which is determined in S68 is described below. As the information stored in the provider operation card, information on meter-reading completion in installation of the gas shutoff device 30 is stored and the information is output from the card processing unit 37 to the control unit 33 by inserting it into the card processing unit 37, in the same way as the pre-paid type card 41.

Further, although it may be a private card in installation, it may be a card the same as the provider operation card that is inserted into the card processing unit 37 after the provider finishes checking at the place, after shutoff with the gas pressure value equal to or less than the predetermined pressure value, which is described below, by using the information stored on the card as checking information at the place.

Further, when the supply of gas is stopped by construction or the like, it is the same event as tampering procurement of the gas, such that a function that clears the check count by inserting the provider operation card into the card processing unit 37, in order to initialize the monitoring function after the construction is finished and the gas is re-supplied.

As described above, the provider can simply and reliably make the function effective by ascertaining normality in checking in the installation, including the pipe, and inserting the provider operation card. Further, it is possible to grasp shutoff due to bypassing of the pipe and prevent tampering procurement of the gas or an unfair practice by stealing of the gas shutoff device.

(Seventh Embodiment)

Figure 10:
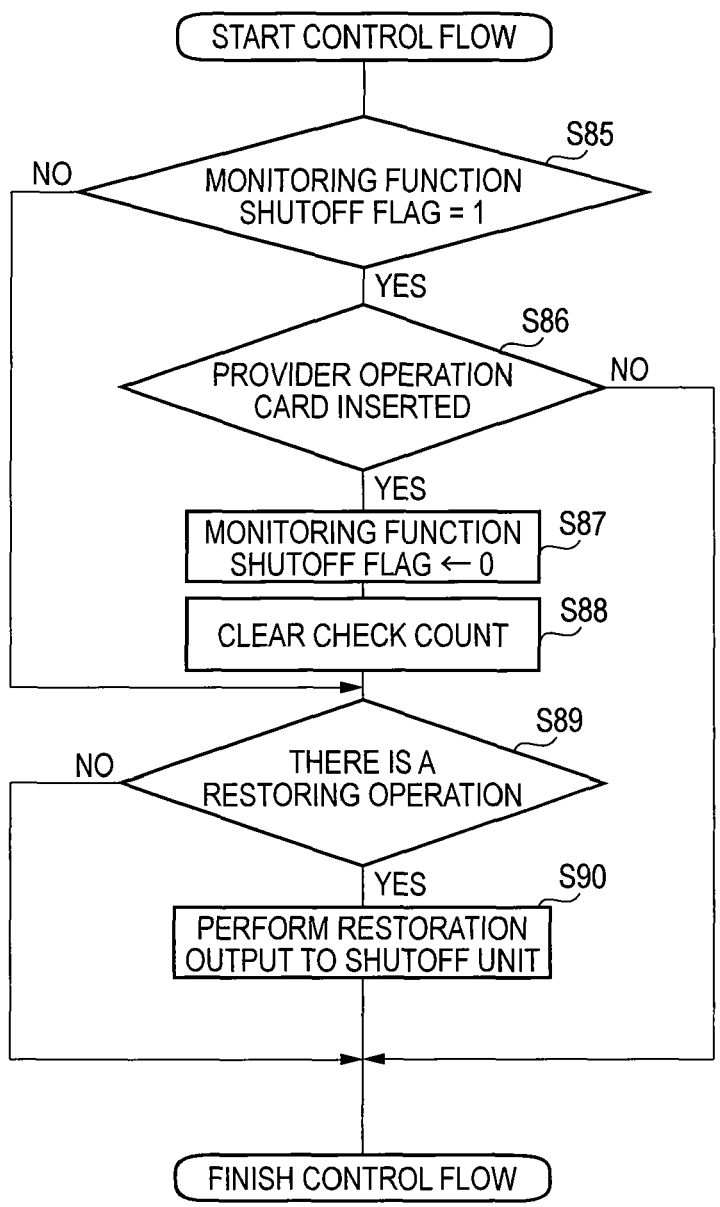
FIG. 10 is a flowchart showing a process of a restoring operation from a shutoff state of the gas shutoff device according to the seventh embodiment of the present invention.

FIG. 10 is a flowchart showing a process of a restoring operation from a shutoff state of the gas shutoff device according to the seventh embodiment of the present invention. Only the control unit 33 and the program shown in FIG. 1, according to the first embodiment, are different and the block diagram of the gas shutoff device is the same as FIG. 1. That is, the control unit 33 stores a program that executes the control flow from S85 to S90 shown in FIG. 10.

In FIG. 10, the control unit 33 determines whether a monitoring function shutoff flag 1 that represents shutoff by monitoring of tampering procurement of the gas is 1 (S85), such that when the monitoring function shutoff flag is 0, the control unit proceeds to S89, or when the monitoring function shutoff flag is 1, the control unit determines whether the provider inserts a provider operation card in installation by input of the card processing unit 37 in S86, such that when the provider operation card inserted, the control unit makes the monitoring function shutoff flag into 0 (S87) and clears the check count in S88. In S89, it is determined whether there is a restoring operation by input from the restoring unit 38, such that when there is a restoring operation, the control unit restores supply of gas by performing restoration output to the shutoff unit 39 (S90).

The provider operation card in installation which is determined in S86 is described below. As the information stored in the provider operation card, information on that the provider finishes checking after shutdown when tampering procurement of the gas is monitored and the information is output from the card processing unit 37 to the control unit 33 by inserting it into the card processing unit 37, in the same way as the pre-paid type card 41. Further, although it may be a private card for restoration, it may be a card the same as the provider operation card in installation described above, by using the information stored on the card as checking information at the place.

As described above, the provider needs to perform checking at the place for the restoration. Further, it is possible to simply and reliably implement the restoration permission state by inserting the provider operation card and it is possible to normalize the unfair positions due to bypassing and ensure safety.

(Eighth Embodiment)

Figure 11:
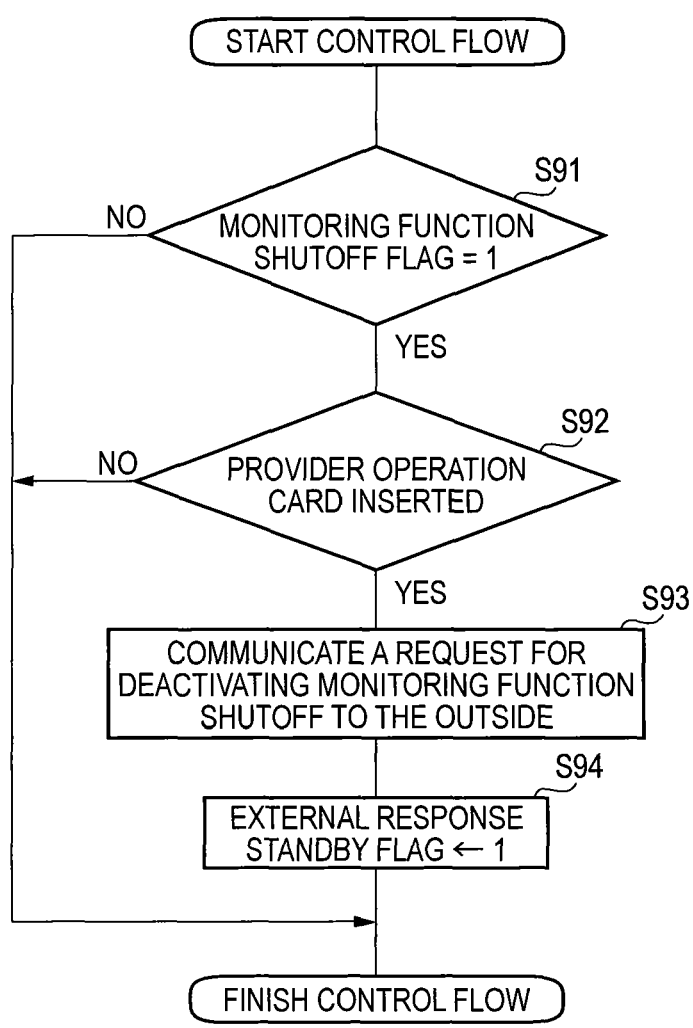
FIG. 11 is a flowchart showing a process of a request for deactivating monitoring function shutoff of the gas shutoff device according to the eighth embodiment of the present invention.
Figure 12:
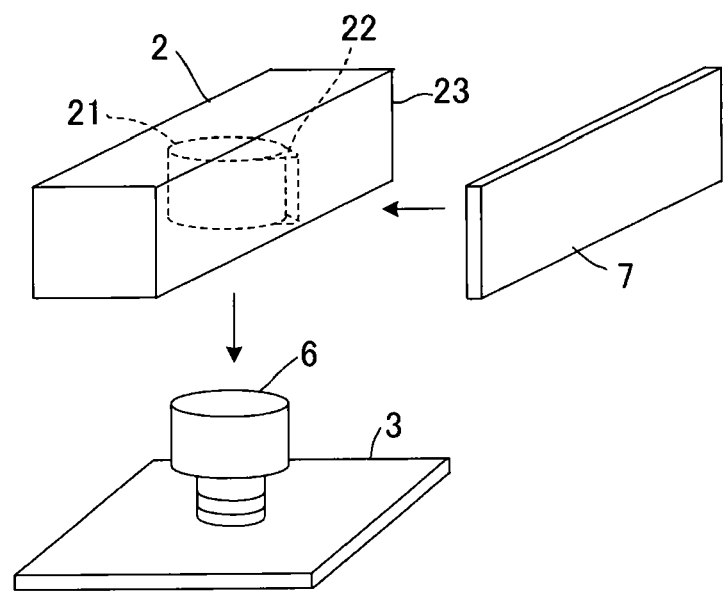
FIG. 12 is a configuration view showing a method of combining a sealing device with a terminal cover of the related art.
Figure 13:
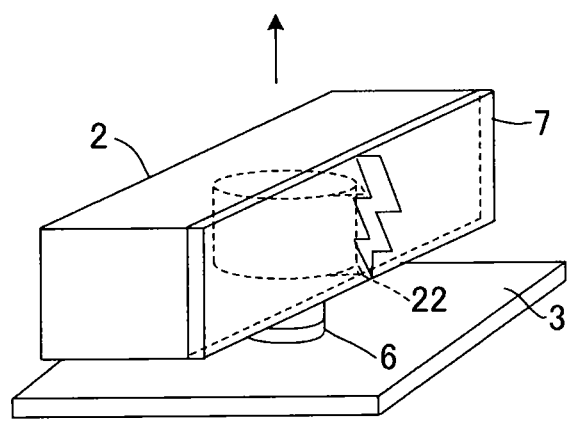
FIG. 13 is a configuration view showing the state when the sealing device of the related art is removed from the terminal cover.
Figure 14:
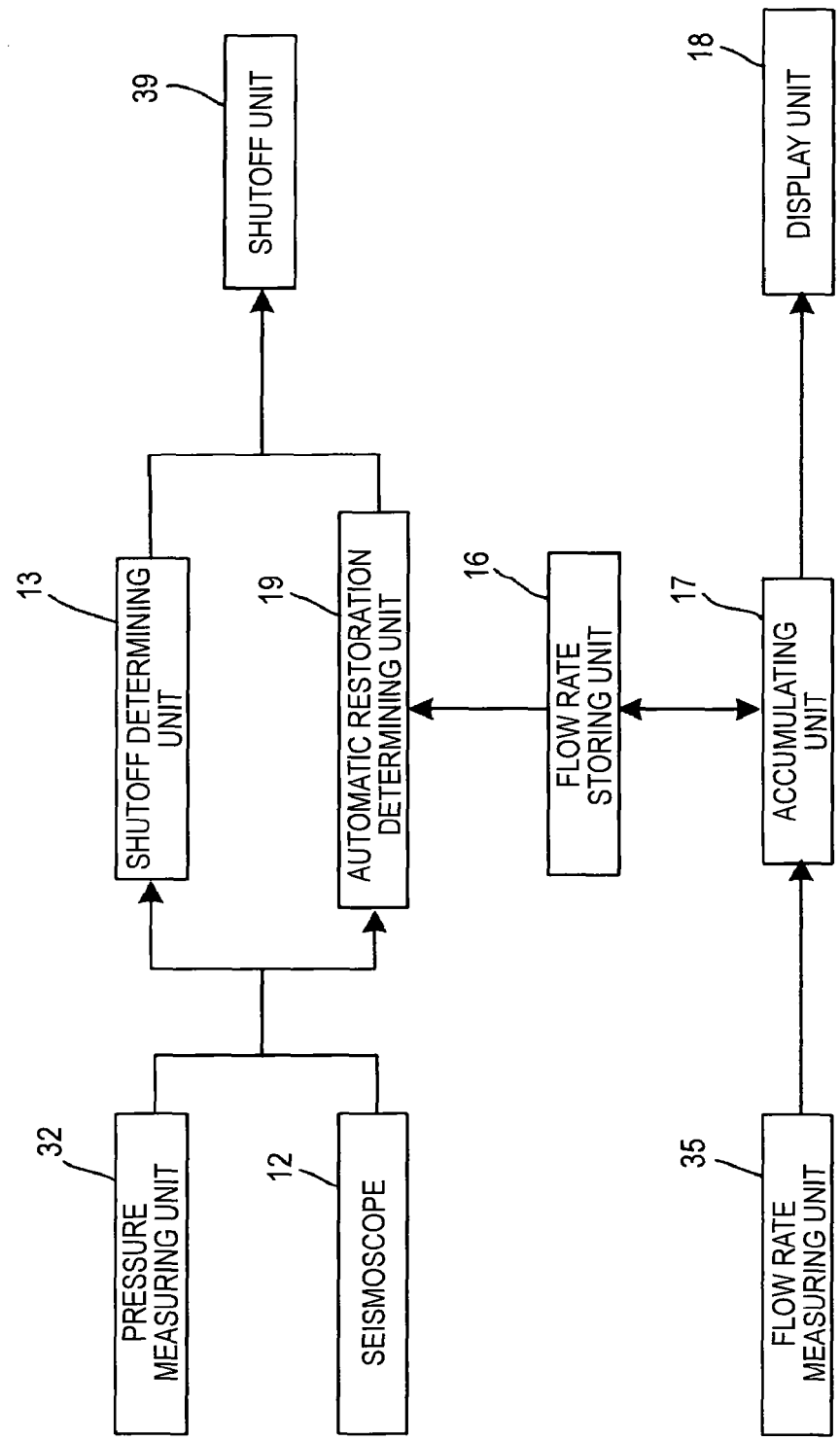
FIG. 14 is a block diagram of a gas shutoff device of the related art.

FIG. 11 is a flowchart showing a process of a request for deactivating monitoring function shutoff of the gas shutoff device according to the eighth embodiment of the present invention. Only the control device 33 and the program shown in FIG. 1, according to the first embodiment, are different and the block diagram of the gas shutoff device is the same as FIG. 1. That is, the control unit 33 stores a program that executes the control flow from S91 to S94 shown in FIG. 11.

In FIG. 11, the control unit 33 determines whether a monitoring function shutoff flag 1 that represents shutoff by monitoring of tampering procurement of the gas is 1 (S91), such that when the monitoring function shutoff flag is 1, the control unit determines whether the provider inserts a provider operation card in installation by input of the card processing unit 37 in S92, such that when the provider operation card inserted, the control unit communicates a request for deactivating monitoring function shutoff by outputting to the external communication unit 34 and makes the external response standby flag into 1 (S94).

Further, the description of the process of a request for deactivating monitoring function shutoff of the gas shutoff device after the external response standby flag is made into 1 is not provided, because it is the same as FIG. 8.

As described above, in the embodiment, the provider can finish checking at the place and reliably manage normalizing of the unfair positions due to bypassing by inserting the provider operation card, and it is possible to leave a record and ascertain soundness of the communication with the outside.

As described above, in the embodiment, the provider can reliably grasp that shutoff is generated by bypassing of the pipe, such that it is possible to prevent tampering procurement of the gas or tamper due to stealing of the gas shutoff device.

Further, in the embodiments described above, although the control flow is executed by operating the microcomputer with the program stored in the control unit, the program may be replaced by hardware.

Although the present invention was described in detail with reference to the specific embodiments, it is apparent to those skilled in the art that the present invention may be changed and modified without departing from the spirit of the present invention.

The present invention is based on Japanese Patent Application (2009-014014), filed on Jan. 26, 2009, and uses the contents as reference.

INDUSTRIAL APPLICABILITY

As described above, the gas shutoff device according to the present invention makes it possible to prevent tampering procurement of the gas by bypassing of the pipe or tamper due to stealing of the gas shutoff device, which cannot be prevented only by sealing the system, such that it can be applied to a water meter.

The invention claimed is:

1. A gas shutoff device comprising:
   a shutoff unit connected to a gas supply pipe to supply or shut off gas;
   a control unit for controlling the shutoff unit;
   a flow rate measuring unit for measuring a flow rate of the gas; a pressure measuring unit for measuring pressure of the gas;
   a restoring unit for turning a gas shutoff state by the shutoff unit into a restoration state for passing the gas; and
   an external communication unit for allowing communication with the outside,
   wherein the control unit shuts off the gas by outputting to the shutoff unit and prohibits a restoring operation by the restoring unit when the following event happens in an output from the pressure measuring unit at a predetermined number of times after a predetermined operation performed by a provider in installation:
   a gas pressure value is kept equal to or less than a first predetermined pressure value for a first predetermined time or longer and then the gas pressure value is kept equal to or more than a second predetermined pressure value for a second predetermined time or longer, wherein the second predetermined pressure value is higher than the first predetermined pressure value.

2. The gas shutoff device of claim 1,
   wherein the control unit communicates with the outside by outputting to the external communication unit, when a predetermined operation is performed by the provider in installation.

3. The gas shutoff device of claim 1 or 2,
   wherein the control unit shuts off the gas by outputting to the shutoff unit and communicates with the outside by outputting to the external communication unit, when the following event happens in an output from the pressure measuring unit at a predetermined number of times after a predetermined operation performed by a provider in installation:
   a gas pressure value is kept equal to or less than a first predetermined pressure value for the first predetermined time or longer and then the gas pressure value is kept equal to or more than the second predetermined pressure value for a second predetermined time or longer.

4. The gas shutoff device of anyone of claims 1 to 3,
   wherein a restoration permission state is implemented by a predetermined operation of the provider after the control unit shuts off the gas by outputting to the shutoff unit, when the following event happens in an output from the pressure measuring unit at a predetermined number of times:
   a gas pressure value is kept equal to or less than a first predetermined pressure value for the first predetermined time or longer and then the gas pressure value is kept equal to or more than the second predetermined pressure value for a second predetermined time or longer.

5. The gas shutoff device of anyone of claims 1 to 3,
   wherein the control unit shuts off the gas by outputting to the shutoff unit and then communicates with the outside by outputting to the external communication unit by a predetermined operation of the provider, and implements a restoration permission state by inputting communication of a response from the outside, when the following event happens in an output from the pressure measuring unit at a predetermined number of times:
   a gas pressure value is kept equal to or less than a first predetermined pressure value for the first predetermined time or longer and then the gas pressure value is kept equal to or more than the second predetermined pressure value for a second predetermined time or longer.

6. The gas shutoff device of anyone of claims 1 to 3, further comprising a card processing unit that reads a pre-paid type card,
   wherein the control unit shuts off the gas by outputting to the shutoff unit and prohibits a restoring operation by the restoring unit, when the following event happens in an output from the pressure measuring unit at a predetermined number of times after an output from the card processing unit triggered by insertion of a provider operation card by the provider in installation:
   a gas pressure value is kept equal to or less than a first predetermined pressure value for the first predetermined time or longer and then the gas pressure value is kept equal to or more than the second predetermined pressure value for a second predetermined time or longer.

7. The gas shutoff device of claim 6, wherein the control unit shuts off the gas by outputting to the shutoff unit and a restoration permission state is implemented by an output from the card processing unit triggered by insertion of a provider operation card by the provider, when the following event happens in an output from the pressure measuring unit at a predetermined number of times:

a gas pressure value is kept equal to or less than a first predetermined pressure value for the first predetermined time or longer and then the gas pressure value is kept equal to or more than the second predetermined pressure value for a second predetermined time or longer.

8. The gas shutoff device of claim 6, wherein the control unit shuts off the gas by outputting to the shutoff unit and communicates with the outside by outputting to the external communication unit when triggered by an output from the card processing unit, said output occurs in response to insertion of a provider operation card by the provider, and a restoration permission state is implemented by inputting communication of a response from the outside, when the following event happens in an output from the pressure measuring unit at a predetermined number of times:

a gas pressure value is kept equal to or less than a first predetermined pressure value for the first predetermined time or longer and then the gas pressure value is kept equal to or more than the second predetermined pressure value for a second predetermined time or longer.

9. The gas shutoff device of claim 1, wherein the control unit prohibits the restoring unit from performing the restoring operation until a predetermined operation of the provider for allowing the restoring operation to resume occurs.

* * * * *